United States Patent [19]
Hoffman et al.

[11] 3,852,427
[45] Dec. 3, 1974

[54] SODIUM BICARBONATE SPHERULITES FROM SODIUM D ESQUICARBONATE

[75] Inventors: Robert J. Hoffman, Liverpool; Lawrence P. Gould, Syracuse, both of N.Y.

[73] Assignee: Allied Chemical Corporation, New York, N.Y.

[22] Filed: Apr. 12, 1973

[21] Appl. No.: 350,455

[52] U.S. Cl............... 423/422, 23/302, 423/190, 423/206 T, 423/266, 423/426
[51] Int. Cl........ C01d 7/10, C01d 7/12, C01d 7/40
[58] Field of Search .......... 423/186, 187, 188, 189, 423/190, 209, 266, 419, 422, 423, 424, 425, 426, 427, 429; 23/300, 301 R, 302

[56] References Cited
UNITED STATES PATENTS

| | | | |
|---|---|---|---|
| 364,552 | 6/1887 | Solvay | 423/188 |
| 1,921,505 | 8/1933 | Chesney | 423/421 |
| 2,773,739 | 12/1956 | Burkholder | 23/302 |
| 2,842,489 | 7/1958 | Svanoe | 423/425 |
| 3,072,466 | 1/1963 | Bauer et al. | 23/300 |
| 3,719,745 | 3/1973 | Saeman | 423/427 |

OTHER PUBLICATIONS
Aslanyan, S.; Comt. Rend. Acad. Bulgare Sci., 18(8) 759–762, (1965), as abstracted by Chemical Abstracts Vol. 63, 1965, 17246f.

Primary Examiner—Oscar R. Vertiz
Assistant Examiner—Gary P. Straub
Attorney, Agent, or Firm—G. P. Rooney; G. H. Fuchs

[57] ABSTRACT

Sodium sesquicarbonate, either natural or synthetic, serves as raw material for the production of spherulites of sodium bicarbonate, which may, in turn, be calcined to produce hard, free-flowing spherules of sodium carbonate.

To an aqueous solution of sodium sesquicarbonate is added about 150 to 2,000 parts per million (ppm) of a water-soluble alkaline phosphate. The solution is then carbonated to an initial temperature of from about 45° to 70°C., and gradually cooled to below about 35°C. The sodium bicarbonate is recovered from the solution in the form of spherulites which are free-flowing, relatively dust free, and generally have a greater bulk density than conventional forms of sodium bicarbonate.

6 Claims, No Drawings

3,852,427

SODIUM BICARBONATE SPHERULITES FROM SODIUM DESQUICARBONATE

CROSS-REFERENCE TO RELATED APPLICATIONS

In co-filed applications entitled: "Method of Producing Sodium Carbonate and Bicarbonate Spherules From Brine," and "Sodium Carbonate and Bicarbonate Spherulites From Chlorine-Electrolytic Cell Liquor," U.S. Appl. Ser. Nos. 350,453 and 350,454, respectively, methods are disclosed for preparing a similar crystalline, free-flowing sodium bicarbonate product having spherical particles, using in the first case a 15 to 25 percent sodium salt of an acid as the feed material, and in the second case weak electrolytic cell liquor.

BACKGROUND OF THE INVENTION

I. Field of the Invention

Sodium sesquicarbonate or "trona," $Na_2CO_3 \cdot NaHCO_3 \cdot 2H_2O$, is found as a natural deposit, being in fact, the most common sodium alkali mineral. Large deposits, for example, are located in the vicinity of Green River, Wyoming. Typically, natural trona contains about 4 to 6 percent insoluble matter. This mineral is mined in increasing amounts for the production of soda ash.

Since trona deposits usually occur in areas remote from industrial centers, much of the sodium sesquicarbonate consumed is produced synthetically from soda ash and sodium bicarbonate.

Sodium sesquicarbonate produced for market finds many uses, for example, as a laundering agent, as a wool scouring agent, as an ingredient of bath salts, and in the manufacture of pharmaceuticals.

The present invention is directed to a process for using sodium sesquicarbonate, either the mined mineral trona or the synthetic sodium sesquicarbonate, as raw material for the production of sodium bicarbonate in the form of dense, free-flowing spherulites, and/or sodium carbonate in the form of hard spherules. Both of these forms are, for many purposes, a distinct improvement over the conventional forms of these products. Not only can larger particles be obtained making up a product of relatively high bulk density, but the spherulities, because of their minimal surface area and density, dissolve more slowly than comparable grades. In certain circumstances this can be quite advantageous, permitting a relatively slow release of the effects sought in using the product, and therefore permitting a lower concentration to exist at any one time.

The products are also exceptionally free-flowing and free of dust, thereby rendering them particularly suitable as process feeds.

II. Description of the Prior Art

Attempts to improve the crystal structure of sodium bicarbonate have been made in the past and are the subject of continuing research. Emphasis has usually been placed on producing a larger, less fragile crystal than that normally obtained commercially. Sodium bicarbonate having a particle size greater than 100 mesh is preferred.

Crystallization techniques have been employed to produce relatively dense sodium carbonate and sodium bicarbonate, but these products are generally granular, and though relatively free-flowing and less conducive to the production of dust than the more conventional varieties of sodium carbonate and bicarbonate, they nevertheless leave considerable room for improvement.

SUMMARY OF THE INVENTION

The present invention is particularly directed to a method for producing a novel and useful sodium bicarbonate in the form of small to fine crystalline spheres, using sodium sesquicarbonate ($Na_2CO_3 \cdot NaHCO_3 \cdot 2H_2O$), as starting material. These spherulites possess unusual properties heretofore not associated with this product. They may be characterized as hard, substantially uniform, free-flowing crystalline spherical particles of sodium bicarbonate which are much more durable than conventional sodium bicarbonate particles. Dust production on handling is minimal and good yields of material having a particle size greater than 100 mesh may be obtained.

Surprisingly, sodium bicarbonate spherulites retain their shape and hardness during calcining. A corresponding new form of sodium carbonate, therefore, may be prepared from this bicarbonate product.

A process is herein disclosed for producing sodium bicarbonate in the form of spherulites from sodium sesquicarbonate comprising, preparing an aqueous solution of the sodium sesquicarbonate; introducing 150 to 2,000 ppm by weight, based on the weight of the sodium sesquicarbonate solution, of a water-soluble alkaline phosphate; carbonating the solution at an initial temperature of about 45° to 70°C. until substantially all of the sodium carbonate present has been converted to bicarbonate; allowing the temperature to gradually drop during the carbonation to below about 35°C.; and recovering the resulting sodium bicarbonate product from the carbonated solution.

The sodium sesquicarbonate charge for this process may be material produced synthetically, or it may be an aqueous solution of natural trona obtained by separating the insoluble material from an aqueous slurry of natural trona.

The recovered sodium bicarbonate spherulites obtained are dried, providing a free-flowing sodium bicarbonate product.

If a sodium carbonate product consisting of comparatively hard, free-flowing spherules is desired, it is only necessary to calcine the sodium bicarbonate spherulites at temperatures ranging from about 150° to 350°C.

DESCRIPTION OF THE PREFERRED EMBODIMENT

In carrying out the process of the present invention, an aqueous solution of sodium sesquicarbonate is prepared containing between about 20 to 24 percent $Na_2CO_3 \cdot NaHCO_3 \cdot 2H_2O$. In order to obtain a complete solution, the sequicarbonate is agitated with the water at about 60° to 70°C.

If natural trona is to be used, a slurry may be prepared and the solids separated to provide a substantially clear solution containing between about 20 and 24 percent sodium sesquicarbonate.

A quantity of an alkaline phosphate ranging from about 150 to 2,000 ppm, by weight, or preferably from about 200 to 1,700 ppm, is added to the solution.

More desirably, between 150 and 2,000 ppm, preferably between 200 and 1,700 ppm of a water-soluble alkali metal phosphate selected from the group consisting of $(NaPO_3)_6$; $K_5P_3O_{10}$; $Na_5P_3O_{10}$; $Na_4P_2O_7$; and $K_4P_2O_7$ is added to the solution. Of these, the alkali phosphate $(NaPO_3)_6$ (sodium hexametaphosphate-SHMP) has been found particularly effective.

The solution is next carbonated with carbon dioxide, said carbonation being initiated at a temperature between about 45° and 70°C., preferably between about 60° and 65°C. As the carbonation continues the temperature is gradually dropped, either spontaneously or with cooling, until it is between about 5° and 35°C. The solution is preferably carbonated to a degree sufficient to insure that all of the carbonate present has been converted to the bicarbonate. The rate of cooling is one of the factors controlling particle size, since slow cooling tends to produce large particles.

The sodium bicarbonate that crystallizes out is in the form of small crystalline spheres composed of elongated crystals radiating outwardly from a central point. These we refer to as spherulites, or crystalline spherules. The handling of this slurry, particularly the filtering step, is facilitated as a result of the spherical nature of the particles. Generally, the product is separated by rotary vacuum filters or in cycle-controlled, continuously running centrifuges.

The bicarbonate spherulites may be washed sparingly with water, with a solution of sodium bicarbonate, and/or, if desired, with organic solvents, such as acetone.

The size, form and hardness of the spherulites can be controlled by the choice and concentration of the phosphate additive and the temperature and rate of cooling during crystallization. A very desirable spherule can be obtained in commercial operation using 1,500 ppm sodium hexametaphosphate as the additive, and an initial carbonation temperature of about 65°C. followed by crystallization with the temperature slowly dropping with agitation to about 30°C.

If it is desired to obtain hard spherules of sodium carbonate, these may be readily obtained by calcining the bicarbonate product at temperatures ranging from about 175 to 350°C. Surprisingly, the spherulites retain their spherical form, with no appreciable loss in strength.

Satisfactory spherules of sodium bicarbonate are obtained using 1,500 ppm of any of the following alkali metal phosphates: $(NaPO_3)_6$; $K_5P_3O_{10}$; $Na_5P_3O_{10}$; $K_4P_2O_7$ and $Na_4P_2O_7$. The soluble alkaline earth phosphates are also satisfactory, but when the product is sodium bicarbonate, it is advisable to confine the additive to the sodium salts rather than to introduce foreign ions.

EXAMPLE I

140 Grams of sodium sesquicarbonate (synthetic) were charged to a one liter beaker equipped with agitator, thermometer, and gas sparger. The solid was dissolved in water at 60°C. in an amount sufficient to make a total volume of 500 milliliters (ml). 1,500 ppm of sodium hexametaphosphate (SHMP) was added and the whole carbonated with pure carbon dioxide over a 90 minute period while allowing the temperature to fall gradually to 30°C. The precipitated solids were filtered, washed with saturated sodium bicarbonate solution followed by acetone, and dried. Spherulites prepared by this procedure, except for the largest mesh sizes, were rather "spiky," that is, it was apparent from their crystalline surface-structure, that they were agglomerates of needle crystals radiating outwardly from a point to thus produce a sphere.

It was found that if the experiment was repeated in the presence of 40 grams of NaCl, introduced at the time the sodium sesquicarbonate was put into solution, the "spiky" characteristics were minimized, and agglomerate rounded particles were obtained.

EXAMPLES II TO IX

A series of runs rather similar to that of Example I were carried out as follows:

280 Grams of sodium sesquicarbonate (synthetic) were charged into a 1,500 ml beaker equipped with agitator, thermometer, and gas sparger. The solid was dissolved in water at 60°C. in an amount sufficient to produce a total volume of one liter. 700 ppm of SHMP was added and the whole carbonated with pure carbon dioxide over a 90 minute period, while allowing the temperature to fall gradually to 30°C. The precipitated solids were filtered, washed with saturated sodium bicarbonate solution followed by acetone and dried. The product obtained was screened to determine the percent remaining on various screens from 10 to 200 mesh.

Similar runs were also carried out with SHMP additions ranging from 150 to 500 ppm. The results of these runs are tabulated below:

SUMMARY

SPHERICAL NaHCO₃ FROM SODIUM SESQUICARBONATE EXAMPLES II – IX

| No. | Feed Liquor (g/l) | SHMP (ppm) | Total Yield (g) | 10 | 20 | 30 | 40 | 60 | 80 | 100 | 140 | 170 | 200 | −200 | Product Form |
|---|---|---|---|---|---|---|---|---|---|---|---|---|---|---|---|
| 2 | 260 | 150 | 96.2 | — | 32.0 | 15.8 | 2.0 | 1.1 | 0.3 | 0.2 | 1.4 | 2.1 | 2.6 | 42.0 | 1 |
| 3 | 270 | 200 | 97.1 | — | 52.0 | 5.8 | 19.3 | 6.9 | 1.8 | 0.5 | 0.5 | 0.6 | 0.6 | 12.1 | 2 |
| 4 | 250 | 200 | 75.0 | 48.1 | 24.6 | 13.3 | 9.3 | 2.5 | 0.2 | 0.2 | 0.3 | 0.2 | 0.5 | 0.4 | 5 |
| 5 | 270 | 300 | 95.0 | 26.6 | 36.4 | 11.9 | 7.4 | 6.6 | 4.6 | 2.0 | 1.8 | 0.9 | 0.5 | 1.4 | 3 |
| 6 | 270 | 400 | 90.4 | 22.4 | 21.6 | 17.9 | 15.5 | 12.1 | 5.6 | 1.2 | 1.7 | 0.7 | 0.4 | 0.9 | 3 |
| 7 | 280 | 500 | 98.7 | — | 35.8 | 26.9 | 9.1 | 7.5 | 3.0 | 1.8 | 2.0 | 0.9 | 0.9 | 10.3 | 2 |
| 8 | 260 | 500 | 84.0 | — | 43.8 | 4.9 | 2.0 | 2.9 | 5.7 | 6.1 | 13.5 | 8.8 | 5.1 | 7.0 | 4 |
| 9 | 280 | 700 | 91.5 | — | 29.3 | 45.6 | 9.9 | 7.5 | 2.8 | 1.2 | 1.4 | 0.8 | 0.4 | 0.9 | 3 |

¹ Mixed smooth and spiky spheres and rounded agglomerates, large amounts of fines.
² Satisfactory spherulites, but the small amount of fines lack spherical form.
³ Satisfactory spherulites, good proportion, relatively large spheres, very little fines.
⁴ Satisfactory—large smooth spheres (⅛" diameter) on 10 mesh.
⁵ Satisfactory—very large smooth spheres (⅜" diameter) on 10 mesh.

At maximum solution concentrations, (approximately 300 g/l. at 60°C.) there is a tendency to form an agglomerated product at all SHMP concentrations, and therefore lesser concentrations appear desirable for more discreet spheres. Note that large smooth spheres are obtained with the more dilute solutions, providing sufficient SHMP (above 150 ppm) is used. Yields, however, fall off as the concentration decreases.

Analytical data indicate that the bulk of the phosphate added to the solution of trona is concentrated in the sodium bicarbonate sphere with a lesser amount retained in the filtrate. When 200 ppm of SHMP was added to the solution, the separated spherulites were found to contain 1,100 ppm while the filtrate contained only 10 ppm.

EXAMPLE X

In a run carried out in the same manner as Example I, using 280 g/l of sodium sesquicarbonate and 1,500 ppm of $K_5P_3O_{10}$ excellent spherulites were obtained.

EXAMPLE XI

In another run, similar to run X, but using 1,500 ppm of $Na_5P_3O_{10}$, the major fraction consisted of nice crystalline spherules passing 100 mesh, but being retained on a 140 mesh screen.

Phosphate additions greater than 2,000 ppm are not recommended, as the yield falls off at higher concentrations.

In conclusion, the crystalline spherules produced by the present process may be characterized as hard, free-flowing sphero-crystals or spherulites, being aggregates of elongated crystals radiating from a central point. The spherulites generally have a bulk density of about 32 to 48 lbs/ft$^3$, and a soluble alkaline phosphate content of between about 1,000 and 2,000 ppm. At least about 80 percent of the spherulites have an average diameter greater than 0.15 mm, or in other words, at least about 80 percent of the spherulites will remain on a 100 mesh sieve (U.S. Standard).

Since changes may be made in carrying out the above process without departing from the scope of the invention, it is intended that all matter contained in the above description shall be interpreted as illustrative and not in a limiting sense.

We claim:

1. A process for making sodium bicarbonate in the form of crystalline spherules from sodium sesquicarbonate comprising:
   a. preparing an aqueous solution of the sodium sesquicarbonate;
   b. introducing 150 to 2,000 ppm by weight of a water-soluble alkali metal phosphate selected from the group consisting of $(NaPO_3)_6$, $K_5P_3O_{10}$, $Na_5P_3O_{10}$, $Na_4P_2O_7$ and $K_4P_2O_7$;
   c. carbonating the solution at an initial temperature of about 45° to 70°C., cooling the solution gradually during the carbonation to below about 35°C. while continuing carbonation until substantially all of the sodium carbonate has been converted to bicarbonate; and
   d. recovering the resulting sodium bicarbonate product from the carbonated solution.

2. The process of claim 1 wherein the product sodium bicarbonate is calcined at temperatures ranging from 150° to 350°C. to provide a sodium carbonate product substantially in the form of hard spherical particles.

3. The process of claim 1 wherein the solution of sodium sesquicarbonate is a 20 to 24 percent aqueous solution of natural trona, previously separated from any water-insoluble materials originally present.

4. The process as claimed in claim 1 wherein the alkali phosphate is $(NaPO_3)_6$ and the quantity used is within the range of 150 to 1,700 ppm.

5. A process for making sodium bicarbonate in the form of spherulites from sodium sesquicarbonate comprising:
   a. preparing an aqueous solution containing between about 20 and 24 percent of the sodium sesquicarbonate;
   b. introducing 150 to 1,700 ppm by weight of a water-soluble alkali phosphate selected from the group consisting of $(NaPO_3)_6$, $K_5P_3O_{10}$, $Na_5P_3O_{10}$, $Na_4P_2O_7$ and $K_4P_2O_7$;
   c. carbonating the solution with carbon dioxide gas at an initial temperature of between about 45° and 70°C., cooling the solution gradually during the carbonation to a temperature between about 5° and 35°C. while continuing carbonation until substantially all of the sodium carbonate has been converted to bicarbonate; and
   d. recovering the resulting sodium bicarbonate crystalline spherulites as product from the carbonated solution.

6. The process of claim 5 wherein a quantity of sodium chloride equivalent to about 20 to 40 percent of the weight of the sodium sesquicarbonate is also included in the sodium sesquicarbonate solution prior to the carbonation step.

* * * * *